United States Patent [19]

Shimomura et al.

[11] 4,357,086
[45] Nov. 2, 1982

[54] FOCUS DETECTING OPTICAL DEVICE OF A SINGLE LENS REFLEX CAMERA

[75] Inventors: Jun Shimomura, Chofu; Hideo Ikeda, Kamakura; Yutaka Iizuka, Tokyo, all of Japan

[73] Assignee: Nippon Kogaku K.K., Tokyo, Japan

[21] Appl. No.: 287,792

[22] Filed: Jul. 28, 1981

[30] Foreign Application Priority Data

Aug. 18, 1980 [JP] Japan ........................ 55/116680[U]
Aug. 18, 1980 [JP] Japan ........................ 55/116681[U]

[51] Int. Cl.$^3$ ............................................. G03B 13/18
[52] U.S. Cl. ...................................... 354/25; 354/31; 354/59; 354/201; 354/225
[58] Field of Search ............... 354/25 R, 25 A, 25 P, 354/25 N, 31 F, 54–56, 59, 155, 199, 200, 201, 219, 224, 225

[56] References Cited

FOREIGN PATENT DOCUMENTS 53-37534 1/1978 Japan .
54-121122 9/1979 Japan .

*Primary Examiner*—Joseph W. Hartary
*Assistant Examiner*—William B. Perkey
*Attorney, Agent, or Firm*—Fitzpatrick, Cella, Harper & Scinto

[57] ABSTRACT

This specification discloses a focus detecting optical device for photoelectrically effecting focus delection by the use of two restricted light beams passed through different areas in the pupil of a phototaking lens in a single lens reflex camera including a finder screen capable of imaging the light beam from the phototaking lens and a pentaprism having reflecting surfaces capable of reflecting a light beam passed through said screen toward an eyepiece lens system having an optical axis substantially orthogonal to said screen. The optical device is provided with light splitting means for splitting a light beam in a direction substantially parallel to the optical axis on that side on which the eyepiece lens system is positioned from a light beam passing from the finder screen to the first reflecting surface of the pentaprism, light distributing means for distributing the split light beam in two directions to provide the two restricted light beams, a first and a second detecting lens system disposed in opposed relationship with each other for receiving the two restricted light beams distributed by the light distributing means, first and second direction changing means for directing the lights passed through the first and second detecting lens systems in directions passing through the opposite sides of the eyepiece lens system, and a first and a second photoelectric conversion element provided at positions capable of receiving the lights directed by the first and second direction changing means.

6 Claims, 5 Drawing Figures

FOCUS DETECTING OPTICAL DEVICE OF A SINGLE LENS REFLEX CAMERA

BACKGROUND OF THE INVENTION

1. Field of the Invention

This invention relates to an optical device of a single lens reflex camera which is capable of focus detection, and more particularly to an optical device which directs two light beams passed through different areas in the pupil of the phototaking lens of a single lens reflex camera to photoelectric conversion elements to thereby effect focus detection.

2. Description of the Prior Art

As an optical device for focus detection of a single lens reflex camera, there is known one in which two light beams leaving a point Q on an object and passing through two different areas in the pupil of a phototaking lens are imaged on a finder screen via a mirror for finder, and further, from a light path passing through the screen and a pentaroof prism to a finder eyepiece, the two light beams split by a beam splitter are re-imaged on separate photoelectric conversion elements. Such optical device includes a detecting optical system for accurately directing the two light beams split by the beam splitter to the separate photoelectric conversion elements. One of the most important problems in such a detecting optical system is how the detecting optical system can be compactly and accurately incorporated into the perimeter of a finder optical system including a pentaprism and an eyepiece. This is because, in the principle of this system, the deviation of the point Q on the object or the deviation of the focus of the phototaking lens on the focal plane of the screen resulting from the movement of the phototaking lens along the optical axis thereof is detected by the above-mentioned two light beams being deviated to left and right on the focal plane and these changing places with each other on the left and right with the position of the focus as the boundary. Accordingly, each element of the optical system for accurately separating and detecting the two light beams must be constructed sturdily and readily machinably so that geometrical-optical, physico-optical and photoelectrical conditions including the configuration, position and characteristic of the photoelectric conversion elements are equal and adjustment is easy to accomplish and difficult to break down. However, the techniques heretofore proposed cannot always be said to satisfy these conditions.

For example, the camera disclosed in Japanese Laid-open Utility Model application No. 37534/1978 has, on the opposite sides of a finder eyepiece provided on the exit surface of the pentaprism, a detecting optical system having a pair of detecting lenses disposed for re-imaging light beams on photoelectric conversion elements. However, if the detecting lenses are disposed in this manner, the optical distance between the finder screen and the detecting lenses will necessarily become great. Making it a proviso that the effective light-receiving surface of the photoelectric conversion elements and the range to be measured of the object being imaged on the finder screen are conjugate with the detecting lenses, an increase in the distance between the finder screen and the detecting lenses brings about a reduction in the light-receiving surface and further, the entire device cannot be compactly constructed unless the photoelectric conversion elements are brought extremely close to the detecting lenses and therefore, the effective light-receiving surface becomes very small. Accordingly, the accuracy of proper disposition of the effective light-receiving surface becomes very severe. Similar disadvantages will also be encountered where the beam splitter is provided within or closely adjacent to the eyepiece.

Conversely, where the detecting lenses are disposed as close as possible to the finder screen, the two light beams exiting from the screen are not yet sufficiently separate from each other at this position and, in a detecting optical system having a sufficiently large opening, this leads to a disadvantage that it is difficult to accurately separate and take out the light beams passed through two areas in the pupil of the phototaking lens and imaged on the screen.

When these points are taken into account, it is desirable to select a value of projection magnification approximate to 1 with respect to the effective light-receiving surface on the photoelectric conversion elements which corresponds to the area to be distance-measured on the screen.

Among the conventional techniques, there are ones in which two light beams immediately after having left the beam splitter are bent upwardly and these light beams are caused to intersect the finder eyepiece optical axis between the eyepiece and the pentaprism or are directed from below to above in the eyepiece (Japanese Laid-open patent application No. 121122/1979), but neither of these techniques are free of the disadvantage that the inverse incident light from the finder eyepiece optical system reaches the photoelectric conversion elements as a flare light to reduce the S/N ratio.

On the other hand, there are conventional single lens reflex cameras in which a light beam split by a beam splitter disposed in a finder optical system is directed onto a photoelectric conversion element through a focus detecting optical system including a filter for cutting lights outside the visible range (for example, infrared light). This filter is for preventing the photoelectric conversion element from reacting to lights outside the visible range and is provided in the focus detecting optical system and can theoretically cut, in addition to lights outside the visible range which are directed to the photoelectric conversion element through the phototaking lens, quick return mirror, beam splitter and focus detecting optical system, the so-called inverse incident light outside the visible range which is directed from the eyepiece portion to the photoelectric conversion element through the eyepiece, pentaprism, beam splitter and focus detecting optical system, but actually does not perform a sufficient function to eliminate the influence of the inverse incident light, particularly the influence of lights outside the visible range.

SUMMARY OF THE INVENTION

It is a primary object of the present invention to provide a focus detecting optical device which can be compactly disposed around the finder of a camera on the basis of the above-described principle.

It is another object of the present invention to provide a single lens reflex camera which is capable of focus detection and which can sufficiently eliminate the influence of lights outside the visible range, of the inverse incident light from the eyepiece portion, upon the photoelectric conversion element.

The invention will become fully apparent from the following detailed description thereof taken in conjunction with the accompanying drawings.

DESCRIPTION OF THE PREFERRED EMBODIMENTS

Figure 1:
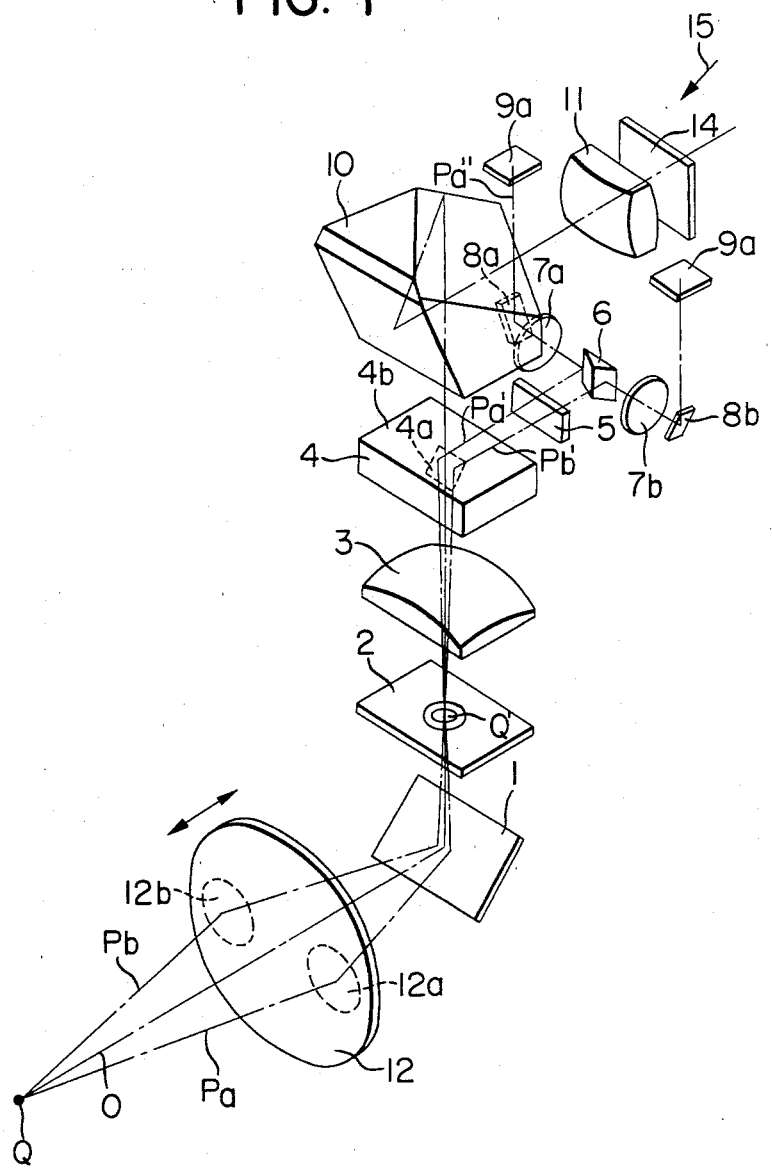
FIG. 1 is a perspective view showing the finder optical system and focus detecting optical system of a camera according to an embodiment of the present invention.

In FIG. 1, two light beams Pa and Pb having left a point Q on an object, enter different areas 12a and 12b in the pupil of a phototaking lens 12, and then are imaged on a screen 2 via a mirror 1 for finder. The two light beams leaving these images and passing through the finder screen 2 are directed through a condenser 3, a beam splitter 4 having a half-mirror portion 4a, a filter 5 for correcting the spectral sensitivity of detected light, and light ray distributing means 6 to two detecting lens systems 7a and 7b, respectively, and further pass through direction changing means 8a and 8b and are again imaged on photoelectric conversion elements 9a and 9b. The detecting lens systems are arranged coaxially with each other (or substantially coaxially with each other), and the distributing means is interposed therebetween so that light beams Pa' and Pb' passed through the finder screen 2 and then caused to emerge rearwardly by the half-mirror 4a of the beam splitter 4 are reflected and distributed to left and right. The direction changing means 8a and 8b direct the light beams emergent from the detecting lens systems 7a and 7b upwardly toward the photoelectric conversion elements 9a and 9b disposed on the opposite sides of an eyepiece optical system.

The finder screen 2 is disposed at a position conjugate with a film surface (not shown) and the focus detecting optical system is designed to re-image the light, passed through the finder screen 2, on the photoelectric elements 9a and 9b. In the present embodiment, the light having left the object Q is divided by the beam splitter 4, whereafter light beams Pa' and Pb' corresponding to the light beams Pa and Pb passed through the different areas 12a and 12b in the pupil of the phototaking lens 12 are respectively distributed by the light distributing means 6, and a light beam Pa" corresponding to the light beam Pa is directed onto the photoelectric element 9a while a light beam Pb" corresponding to the light beam Pb is directed onto the photoelectric element 9b. Accordingly, when the phototaking lens 12 is moved along the optical axis thereof, the optical images on the photoelectric elements 9a and 9b move on these elements 9a and 9b and when the image on the element 9a and the image on the element 9b have assumed a predetermined positional relationship, it can be detected from the photoelectric outputs of the elements 9a and 9b that the phototaking lens 12 is in in-focus position. The correcting filter 5 disposed immediately before the distributing means 6 has the characteristic of cutting a long wavelength side light outside the visible range to correct the spectral sensitivities of the photoelectric conversion elements 9a and 9b, and is constructed as a single member which covers the entire opening to the distributing means 6. Outside the eyepiece optical system 11, there is provided a filter 14 for cutting a long wavelength side light outside the visible range which is contained in an eyepiece inverse incident light 15. As seen from FIG. 1, the filter 5, the light ray distributing means 6, the detecting lens systems 7a, 7b, and the direction changing means 8a, 8b may be compactly arranged in T-shape in a plane under the eyepiece optical system 11.

Figure 2:
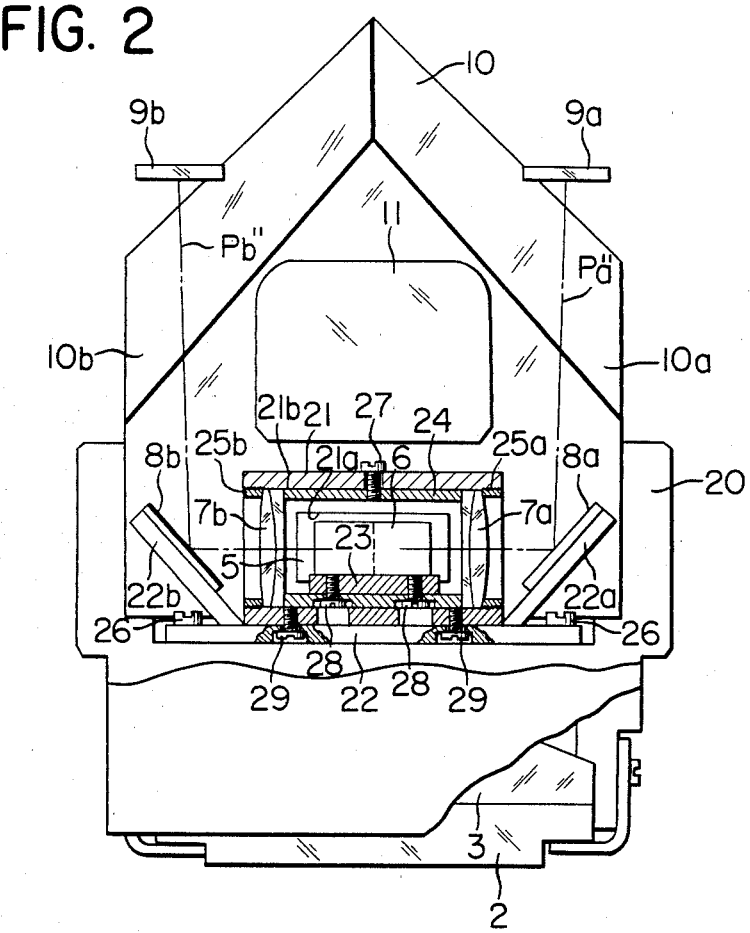
FIG. 2 is a partial cross-sectional view of the device according to an embodiment of the present invention.

FIG. 2 shows an embodiment in which these have been made into a unit and incorporated into a camera. A pentaprism 10, the condenser lens 3 and the finder screen 2 are integrally mounted on a finder body 20, and a detecting system unit holder 22 is secured thereto by means of mounting screws 26. Direction changing means supporting portions 22a and 22b are integrally formed on the left and right ends, respectively, of the unit holder 22, and the direction changing means 8a and 8b are adhesively secured thereto. A detecting optical system unit 21 is further secured to the holder unit 22 by means of set screws 29. In the face of the detecting optical system unit 21 which faces the beam splitter 4a disposed forwardly thereof, there is an opening 21a and the correcting filter 5 is adhesively secured so as to cover the opening 21a. The unit 21 assumes a substantially cylindrical shape and the inner surface 21b thereof is formed into the shape of a single lens barrel which can hold the left and right detecting lens systems 7a and 7b very accurately and coaxially with each other. Designated by 24 is a precisely machined spacer ring which is supported in the unit 21 by a set screw 27 to hold the optical systems 7a and 7b at predetermined positions and support a holding member 23 integral with the light ray distributing means 6 by set screws 28. Although not shown, it will be appreciated that this spacer ring 24 is also formed with an opening for incidence of light substantially at the same position as the opening 21a of the unit 21, the opening being of the same size as the opening 21a. All of these lie in the lower portion of the finder eyepiece optical system 11 so that, as a rule, light beams Pa" and Pb" travelling toward the photoelectric conversion elements lying above the finder eyepiece optical system 11 travel upwardly on the opposite sides of the finder eyepiece optical system after having emerged from the direction changing means 8a and 8b. The unit holder 22 and the supporting portions 22a, 22b; the unit holder 22 and the unit 21 and the spacer ring 24; and the spacer ring 24 and the holding member 23 may be made adjustable so that their relative positions can be varied.

Figure 3:
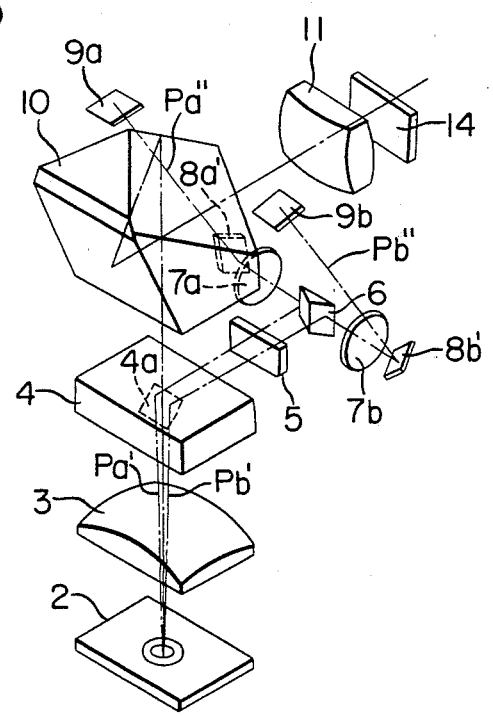
FIG. 3 is a perspective view of the optical system according to another embodiment of the present invention.

In the embodiment shown in FIG. 3, the positions of photoelectric conversion elements 9a and 9b are closer to the rear end 10a of the roof of the pentaprism than those in FIG. 1 and the direction changing means 8a' and 8b' are inclined to thereby incline the directions of emergence of light beams Pa" and Pb", and this leads to the possibility of making the entire system more compact and is also useful to make the finder into a unit and enable it to be removably mountable as an interchangeable finder on a camera body. Of course, making the finder body 20 integral with the camera body does not depart from the scope of the present invention, but as is clear from FIGS. 1 and 3, the finder optical system comprising chiefly the pentaprism 10 and the eyepiece optical system 11 has a degree of freedom with which it can be mounted or dismounted by being moved upwardly as well as forwardly and rearwardly relative to the camera body.

If the major optical members such as the detecting optical systems 7a, 7b, the light ray distributing means 5, the correcting filter 5 and the direction changing means 8a, 8b, are made integral with the detecting system unit holder 22 and made into a unit, as described above, they can be individually adjusted before being incorporated into the finder optical system and this leads to good productivity. If required, the photoelectric conversion elements 9a and 9b may also be made integral with the unit holder.

Also, as is apparent from FIGS. 1 and 3, the finder optical system and the focus detecting optical system are completely independent of each other in the portions thereof subsequent to the half-mirror 4a of the beam splitter 4 and individually surround the light path to thereby intercept light and are therefore less susceptible to the adverse influence of the eyepiece inverse incident light 15.

Figure 4:
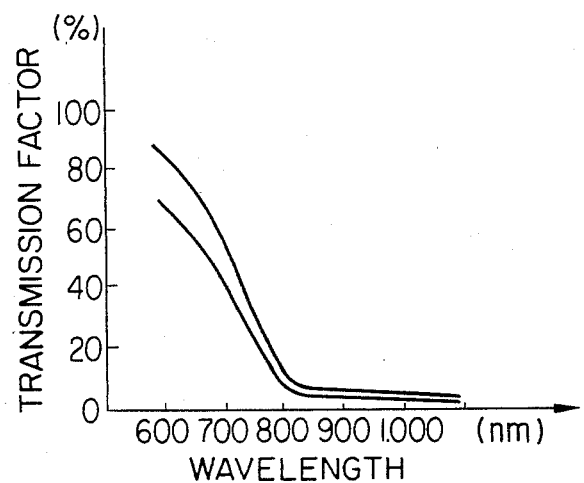
FIG. 4 is a graph illustrating the characteristic of a spectral sensitivity correcting filter.

The inverse incident light 15 from the eyepiece portion (not shown) might be directed onto the photoelectric conversion elements 9a and 9b through the filter 14, eyepiece 11, pentaprism 10, beam splitter 4 and focus detecting optical system. However, in the present device, such light passes through the filter 14 and the filter 5 onto the photoelectric conversion elements 9a and 9b. Accordingly, the inverse incident light is almost prevented from affecting the photoelectric conversion elements 9a and 9b by the two filters 14 and 5. The greater the long wavelength cutting performance of the filter 14, the better, but the filter 14 must not be one through remarkable coloring or interference color offensive to the eye is recognized when the filter is observed through the finder eyepiece portion (not shown). It is desirable that the long wavelength cutting performance of the filter 14 be equal to or greater than that of the filter 5. FIG. 4 illustrates the long wavelength cutting performances of the filters 5 and 14.

The photoelectric conversion elements 9a and 9b used in the embodiments shown have a characteristic that they do not react to short wavelength lights outside the visible range. Accordingly, they can sense only the light in the visible range to thereby accomplish focus detection. Of course, if use is made of photoelectric conversion elements which do not react to lights outside the visible range (lights of long and short wavelengths), the filter 5 may be omitted.

The eyepiece optical system 11 or a part thereof may be formed of filter glass to thereby form the filter 14. By taking it into account that such filter glass is somewhat inferior in weather-resistant property to ordinary glass, it is preferable that the filter 14 be formed with such filter glass sandwiched in the eyepiece optical system 11. If the filter 14 is formed as a filter by thin film evaporation, the thin film may be deposited by evaporation not only on the eyepiece optical system 11 but also on the entrance or exit surface or the reflecting surface of the pentaprism. Also, the thin film may be deposited on the upper surface 4b of the beam splitter 4 or the characteristic of cutting a light of long wavelength for obliquely incident light may be imparted to a translucent film 4a and for that purpose, the thin film may be made into a multilayer film or a composite film with the influence by the colored polarization of the translucent film 4a being taken into account. Further, it is also useful that a thin film for cutting the long wavelength components of the flare lights incident at various angles is formed on the surfaces of the eyepiece optical system 11, pentaprism 10 and beam splitter 4 which directly contribute to transmission and reflection of light and that a coating capable of well absorbing long wavelength components in particular is provided for flare light incident on surfaces on or by which light is not directly incident or reflected.

Figure 5:
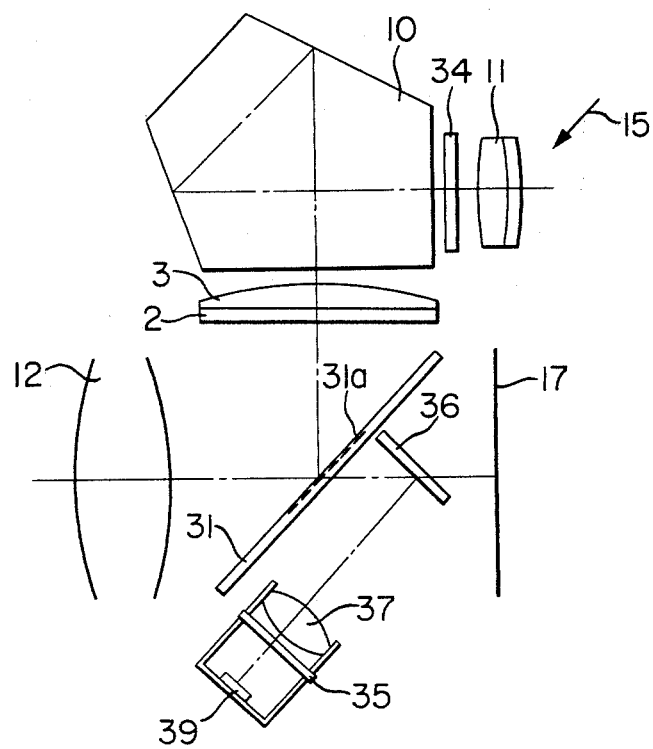
FIG. 5 is a schematic cross-sectional view of a camera according to still another embodiment of the present invention.

In the embodiments hitherto described, the photoelectric detecting optical system is provided so as to receive the light beam split by the beam splitter disposed rearwardly of the finder screen 2, but again in a single lens reflex camera of the type as shown in FIG. 5 wherein a part 31a of a movable mirror 31 disposed forwardly of a finder screen 2 is made translucent and a light ray passed through such part is directed to a photoelectric conversion element 39 via a photoelectric focus detecting optical system 37 lying on the bottom surface of the camera body, a filter 35 corresponding to the filter 5 in FIG. 1 and a filter 34 corresponding to the filter 14 in FIG. 1 may be provided in order to reduce the adverse influence of the inverse incident light from the finder, whereby a similar effect may be obtained for the inverse incident light from the finder.

We claim:

1. In a focus detecting optical device for photoelectrically effecting focus detection by the use of two restricted light beams passed through different areas in the pupil of a phototaking lens in a single lens reflex camera including a finder screen capable of imaging the light beam from the phototaking lens and a pentaprism having reflecting surfaces capable of reflecting a light beam passed through said screen toward an eyepiece lens system having an optical axis substantially orthogonal to said screen, the improvement comprising:

light splitting means for splitting a light beam in a direction substantially parallel to said optical axis on that side on which said eyepiece lens system is positioned from a light beam passing from said finder screen to the first reflecting surface of said pentaprism;

light distributing means for distributing said split light beam in two directions to provide said two restricted light beams;

a first and a second detecting lens system disposed in opposed relationship with each other for receiving said two restricted light beams distributed by said light distributing means;

first and second direction changing means for directing the lights passed through said first and second detecting lens systems in directions passing through the opposite sides of said eyepiece lens system; and a first and a second photoelectric conversion element provided at positions capable of receiving the lights directed by said first and second direction changing means.

2. The improvement recited in claim 1, wherein said first and second direction changing means cause the lights from said first and second detecting lens systems to exit from the vicinity of said eyepiece lens system toward said pentaprism.

3. The improvement recited in claim 1, wherein said device further includes support means for supporting at least said light distributing means and said first and second detecting lens systems integrally.

4. The improvement recited in claim 1 or 3, wherein said first and second detecting lens systems are disposed in such a manner that the optical axes thereof lie on the same axis.

5. In a single lens reflex camera having a finder observation optical system for directing a light passed through a phototaking lens to an eyepiece portion, a beam splitter disposed in said optical system for splitting a light beam, a focus detecting optical system for directing the light beam split by said beam splitter to photoelectric conversion means, and a first filter provided in said focus detecting optical system and having the characteristic of cutting lights outside the visible range, whereby focus detection is photoelectrically possible from the output of said photoelectric conversion means, the improvement comprising:
  a second filter provided in said finder observation optical system and having the characteristic of cutting lights outside the visible range; and
  means for determining the positional relation between said first and second filters so that the light entering from said eyepiece portion passes to said photoelectric conversion means through said second and said first filter.

6. In a single lens reflex camera having a finder observation optical system for directing a light passed through a phototaking lens to an eyepiece portion, a beam splitter disposed in said optical system for splitting a light beam, and a focus detecting optical system for directing the light beam split by said beam splitter to photoelectric conversion means having the characteristic of cutting lights outside the visible range, whereby focus detection is photoelectrically possible from the output of said photoelectric conversion means, the improvement comprising:
  filter means provided in a light path passing from said eyepiece portion of said finder observation optical system to said photoelectric conversion means and having the characteristic of cutting lights outside the visible range.

* * * * *

UNITED STATES PATENT AND TRADEMARK OFFICE
CERTIFICATE OF CORRECTION

PATENT NO. : 4,357,086

DATED : November 2, 1982

INVENTOR(S) : JUN SHIMOMURA, ET AL.

It is certified that error appears in the above—identified patent and that said Letters Patent is hereby corrected as shown below:

Column 5, line 36, after "through" insert --which--.

Signed and Sealed this

Eighteenth Day of January 1983

[SEAL]

Attest:

GERALD J. MOSSINGHOFF

Attesting Officer     Commissioner of Patents and Trademarks